(12) United States Patent
Roffman et al.

(10) Patent No.: US 8,801,176 B2
(45) Date of Patent: Aug. 12, 2014

(54) CONTACT LENSES WITH IMPROVED MOVEMENT

(75) Inventors: Jeffrey H. Roffman, Saint Johns, FL (US); Philippe F. Jubin, Fernandina Beach, FL (US); Douglas G. Vanderlaan, Jacksonville, FL (US); Edgar V. Menezes, Jacksonville, FL (US); Gregory J. Hofmann, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 374 days.

(21) Appl. No.: 13/071,307

(22) Filed: Mar. 24, 2011

(65) Prior Publication Data

US 2012/0242950 A1 Sep. 27, 2012

(51) Int. Cl.
G02C 7/04 (2006.01)

(52) U.S. Cl.
CPC .............. G02C 7/043 (2013.01); *G02C 7/048* (2013.01); *G02C 7/049* (2013.01)
USPC ................................ 351/159.36; 351/159.19

(58) Field of Classification Search
CPC ......... G02C 7/043; G02C 7/048; G02C 7/049
USPC ............. 351/159.02, 159.07, 159.14, 159.19, 351/159.33, 159.36
See application file for complete search history.

(56) References Cited

U.S. PATENT DOCUMENTS

| | | | |
|---|---|---|---|
| 2,196,066 A * | 4/1940 | Feinbloom | 351/219 |
| 4,312,575 A | 1/1982 | Peyman et al. | |
| 4,495,313 A | 1/1985 | Larsen | |
| 4,618,227 A | 10/1986 | Bayshore | |
| 4,632,844 A | 12/1986 | Yanagihara et al. | |
| 4,680,336 A | 7/1987 | Larsen et al. | |
| 4,889,664 A | 12/1989 | Kindt Larsen et al. | |
| 5,039,459 A | 8/1991 | Kindt Larsen et al. | |
| 5,044,742 A | 9/1991 | Cohen | |
| 5,057,578 A | 10/1991 | Spinelli | |
| 5,314,960 A | 5/1994 | Spinelli et al. | |
| 5,371,147 A | 12/1994 | Spinelli et al. | |
| 5,805,264 A | 9/1998 | Janssen et al. | |
| 6,099,852 A | 8/2000 | Jen | |
| 6,478,423 B1 | 11/2002 | Turner et al. | |
| 6,893,685 B2 | 5/2005 | Qiu et al. | |
| 6,926,965 B2 | 8/2005 | Qiu et al. | |
| 7,040,757 B2 | 5/2006 | Hall et al. | |
| 7,503,652 B2 | 3/2009 | Menezes | |
| 7,543,935 B2 | 6/2009 | Ezekiel | |
| 7,798,639 B2 | 9/2010 | Winterton et al. | |

(Continued)

FOREIGN PATENT DOCUMENTS

| | | |
|---|---|---|
| NL | 1022850 C2 | 1/2004 |
| WO | 90/08339 A1 | 7/1990 |

OTHER PUBLICATIONS

U.S. Appl. No. 13/071,324, filed Mar. 24, 2011 Johnson & Johnson; Entitled: Contact Lenses With Improved Movement; Inventors: Jeffrey H Roffman, Philippe Jubin; Douglas Vanderlaan Assignee: Johnson & Johnson Vision Care, Inc.

(Continued)

*Primary Examiner* — Jordan Schwartz (57) ABSTRACT

Contact lenses have design features to enhance translational properties such as dimples and coating treatments.

21 Claims, 4 Drawing Sheets

(56) References Cited

U.S. PATENT DOCUMENTS

| | | | |
|---|---|---|---|
| 7,878,650 B2 | 2/2011 | Fritsch et al. | |
| 2006/0203189 A1* | 9/2006 | Ho et al. | 351/160 R |
| 2007/0132948 A1* | 6/2007 | Evans et al. | 351/161 |
| 2008/0278679 A1* | 11/2008 | Ferrara | 351/161 |
| 2009/0303432 A1* | 12/2009 | Suzuki et al. | 351/160 R |
| 2010/0171924 A1 | 7/2010 | Perrin | |
| 2011/0116035 A1* | 5/2011 | Fritsch et al. | 351/162 |

OTHER PUBLICATIONS

International Search Report for related Application No. PCT/US2012/029250 dated Jun. 27, 2012.

* cited by examiner

CONTACT LENSES WITH IMPROVED MOVEMENT

BACKGROUND OF THE INVENTION

As people age, their eyes are less able to accommodate, or bend the natural lens, to focus on objects that are relatively near to the observer. This condition is known as presbyopia. Contact lenses can be worn to address presbyopia. In one type of such lenses, distance and near vision regions are concentrically arranged around the geometric center of the lens. Light passing through the optic zone of the lens is concentrated and focused at more than one point in the eye.

In another type of lens, a segmented lens, near and distance vision regions are not concentric about the geometric center of the lens. The wearer of the segmented lenses is able to access the near vision region of the lens because the lens is constructed to allow it to translate, or move vertically relative to the pupil of the wearer's eye. The lens moves vertically when the person wearing the lens shifts their gaze downwardly to read. This upwardly positions the near vision portion in the center of the wearer's gaze. Essentially all of the light passing through the optic zone can be focused at a single point in the eye based on gaze.

A common type of translating lens has a truncated shape. That is, unlike most lenses that are completely circular or oval, the lower portion of the truncated contact lens is flattened as by cutting off or shortening that part of the lens. Exemplary references to such lenses include U.S. Pat. No. 7,543,935, incorporated herein by reference. Other designs may be circular or elliptical but, in such cases, have other design features to enable them to move on the eye with gaze change. Improving the translational properties of translating contact lenses is desirable.

Another type of translating lens has an outer shape which is continuously circular or oval, but contain a substantially thickened portion peripheral to the central optical zone. This thickened portion is intended to contact the lower lid and translate with blink. Exemplary references to such a lens are described in U.S. Pat. No. 7,040,757 and U.S. 20100171924, incorporated herein by reference. In these examples, the thickness in the peripheral portions of the lens outside the optical zone is substantially uniform for meridians parallel to the vertical meridian of the lens, and a lens according to this invention exhibits mirror symmetry with respect to a plane cutting through the vertical meridian. Unfortunately, this will not lead to the intended translation when worn on an eye.

In another type of contact lens, a silicone hydrogel material is employed. These materials may be used in single vision lenses or translating designs, and they have the advantage of providing increased transmission of oxygen to the ocular tissues, but they may not move with blink on the eye as readily as other contact lenses. Exemplary references to such a material are described in U.S. Pat. No. 6,099,852, incorporated herein by reference. Improving the movement of silicone hydrogel contact lenses is desirable.

SUMMARY OF THE INVENTION

In one aspect of the invention, a contact lens has back surface translational elements.

In another aspect of the invention, contact lenses have back surface translational elements that are dimples.

In a yet further aspect of the invention, contact of lenses have dimples on their back surfaces that are spaced apart so that the dimple centers is between about 10 to about 500 microns, preferably between about 100 and about 400 microns, and more preferably between about 300 to about 400 microns.

In a yet further aspect of the invention, contact lenses have dimples on their back surfaces having a depth of between about 5 to about 60 microns, preferably between about 10 to about 40 microns, and more preferably between about 20 to about 30 microns.

In a yet further aspect of the invention, contact lenses have dimples on their back surfaces having a diameter of between about 2 to about 500 microns, preferably between about 50 to about 400 microns, and more preferably between about 100 to about 300 microns.

In a yet further aspect of the invention, contact lenses have dimples on their back surfaces that occupy a range of area between about 5% to about 75% of the total lens back surface, preferably between 5% and 25% of the total back surface area.

In yet a further aspect of the invention, not more than about 500 dimples are provided on the back surface of lens having a surface area of about 160 $mm^2$. Preferably, there are between 150 and 300 such dimples.

In a yet further aspect of the invention, contact lenses have dimples on their back surfaces that are circular, elliptical, square, rectangular, triangular, pentagonal, polygonal or elongated in at least one direction.

In a yet further aspect of the invention, contact lenses have dimples on their back surfaces in which at least some of the dimples are in contact with at least one other dimple.

In a yet further aspect of the invention, contact lenses have dimples on their back surfaces that are distributed over the entire surface.

In a yet further aspect of the invention, contact lenses have dimples on their back surfaces that are distributed over a portion of the entire surface.

In a yet further aspect of the invention, contact lenses have dimples on their back surfaces that are distributed over the peripheral region that is generally larger than the pupil of the eye.

In a yet further aspect of the invention, contact lenses have dimples on their back surfaces that are distributed in a regular pattern.

In a yet further aspect of the invention, contact lenses have dimples on their back surfaces that are distributed according to a geometric placement scheme.

In a yet further aspect of the invention, contact lenses have dimples on their back surfaces that are distributed in a random pattern.

In a yet further aspect of the invention, a contact lens is treated on its back surface with an agent that renders it lubricious. The agent can be any coating material compatible with use on a contact lens. The coating can be a single layer or multiple layers.

In yet a further aspect of the invention, the contact lenses are of a single power.

In yet a further aspect of the invention, the contact lenses have a spherocylindrical power.

In yet a further aspect of the invention, the contact lenses are multifocal.

DETAILED DESCRIPTION

The invention provides methods and designs for improving the movement or translation of contact lenses. As used herein, "translation" refers to the movement of a contact lens either with blink or in downgaze. These lenses may be single power designs, or they may be multifocal with the function of correcting presbyopia; and methods for producing the lenses of the invention. The lenses of the invention are translating contact lenses with design features that enhance their translational properties.

The translating contact lenses of the invention can be truncated, circular or oval-shaped. Preferably, they are not truncated and are lenses without a substantially flat or straight portion about their circumference. The lenses of the invention have an optic zone with at least a distance power, and in the case of a multifocal, one near vision zone and preferably at least one distance vision zone. Alternately, the lenses of the invention contain a spherocylindrical power. Alternatively, the optic zone has more than one distance zone and/or more than one near zone; preferably, one distance zone lies substantially at or above the horizontal meridian of the lens and a near vision zone lies at or beneath the horizontal meridian. Optionally, the optic zone of the lens has one or more intermediate vision zones.

A distance vision zone is a zone that provides the distance optical power or the amount of refractive power required to correct the lens wearer's distance vision acuity to the desired degree. A near vision zone is a zone that provides the near optical power or the amount of refractive power required to correct the wearer's near vision acuity to the desired degree. An intermediate vision zone is a zone that provides the optical power or the amount of refractive power required to correct some amount of the lens wearer's distance vision acuity for viewing objects typically between the wearer's preferred distance and near vision range. Lenses according to the present invention can have a single optical power or they may be multifocal.

In one embodiment, lenses of the invention are circular or elliptical. In the multifocal aspect of the invention, the lenses translate by virtue of a pseudotruncation which is a design feature that enables movement on the eye as the direction of gaze changes as a truncated lens would so that distance or near vision is corrected accordingly. This feature participates in the translation of the lens by interacting with the lower eyelid so that as gaze is shifted down, the eyelid causes the lens to move in the direction of the superior portion of the eye. As the gaze is shifted up, the eyelid causes the lens to move in the direction of the inferior portion of the eye. Preferably, translation of the lens when the gaze is shifted down occurs due to the pushing of the lower eyelid against the pseudotruncation. The lenses of the invention may have a variety of other corrective optical characteristics incorporated onto the surfaces in addition to distance and near optical powers, such as, for example, cylinder power.

Lenses of the invention have design features to improve translation of the lens as the wearer blinks or changes gaze from straight ahead to a down gaze and vice versa. The most preferred design features that perform this function are dimples on the back surface of the lens. The preferred dimple is circular when viewed from above but the dimples may be triangular, square, pentagonal, hexagonal, heptagonal, octagonal, etc. In addition to these radial symmetric shapes the dimples may also have shapes such as ovals or ellipses or irregular patters. Possible cross-sectional shapes include, but are not limited to, circular arc, truncated cone, flattened trapezoid, and profiles defined by a parabolic curve, ellipse, semi-spherical curve, saucer-shaped curve, sine curve, or the shape generated by revolving a catenary curve about its symmetrical axis. Other possible dimple designs include dimples within dimples and constant depth dimples. In addition, more than one shape or type of dimple may be used on a single surface.

Dimple design can be defined not only by the shape of the individual dimples but also by their diameters, depths, and the patterns of the dimples on the back surface of the lens. Diameter in this case is the distance from edge to edge when the dimple is circular and, when the dimples are non-circular it is the diameter of a circle having the same area as the non-circular dimple. Depth is the distance from the continuation of the periphery of the dimple to the deepest part of a dimple. Dimples according to the invention have diameters from between about 2 to about 500 microns and depths of between about 5 to about 60 microns. Preferably, diameters are between about 50 to about 400 microns and depths are between about 10 to about 40 microns. More preferably, diameters are between 100 and 300 microns and depths are between 20 and 30 microns.

Dimples are spaced apart so that the distance between their centers is between about 10 to about 500 microns, preferably between about 100 to about 400 microns, and more preferably between about 300 to about 400 microns. The dimples occupy a proportion of the total back surface area; the proportion of said total area occupied by said dimples is between about 5 to about 75 percent, more preferably between 5 and 25 percent.

Another consideration in dimpling a lens back surface to improve its translational properties is the pattern of dimpling. One method of positioning or packing dimples on a surface is to divide the surface into eight spherical triangles corresponding to the faces of an octahedron. Dimples are then positioned within each of the surface divisions according to a placement scheme. The surface divisions may be further divided and the resulting subdivisions packed with dimples.

Another dimple packing method divides the back surface of the lens into 20 spherical triangles corresponding to the faces of an icosahedron. Dimples are then positioned within each of the surface divisions according to a placement scheme. The surface divisions may be further divided and the resulting subdivisions packed with dimples. Icosahedron-based dimple patterns incorporate a high degree of hexagonal packing.

Dimple patterns having overlapping dimples are also possible as are random placements of dimples. Generally, not more than about 500 dimples are provided on the back surface of lens having a surface area of about 160 mm$^2$. Preferably, there are between about 150 to about 300 such dimples. Dimple shapes and patterns can also be defined by fractal geometry. The dimples may be placed on the entire back surface or a portion of the back surface, preferentially on the peripheral portion of the back surface.

A fractal shape design may be generated by a succession of intermediate constructions created by an initiator and a generator. The initiator may be a two-dimensional Euclidean geometric shape. For example, the initiator may be a polygon having $N_0$ sides of equal length, such as a square ($N_0$=4) or an equilateral triangle ($N_0$=3). The initiator also may be a segmented line having two ends and made up of a plurality of straight segments, which are joined to at least one other segment. The generator is a pattern comprised of lines and/or curves. Like an initiator, a generator may be a segmented line having two ends and made up of a plurality of straight segments, which are joined to at least one other segment. A first intermediate construction is created by replacing parts of the initiator with the generator. Then a second intermediate construction is created by replacing parts of the first intermediate construction with the generator. The generator may have to be scaled with each intermediate construction. This process is repeated until the fractal shape is complete.

The surface properties of the back surface of a lens can also be modified to enhance the translational properties of the lens. The lens can be coated on the entire surface or in one portion of the surface. For example, in some embodiments only the optic zone is coated. In other embodiments, only the peripheral zone is coated. In yet other embodiments, the back surface is coated so that it varies with the overall thickness of the lens at any given point.

Coatings can include, for example, a swellable coating such as by application of a suitable hydrophilic coating. Preferred hydrophilic coatings include, without limitation, poly (acrylic acid), poly(methacrylic acid), poly(maleic acid), poly(itaconic acid), poly(acrylamide), poly(dimethacrylamide), block or random copolymers of (meth)acrylic acid, acrylic acid, maleic acid, itaconic acid with any reactive vinyl monomer, carboxymethylated polymers, such as carboxymethylcellulose, dextran, polyvinyl alcohol, polyethylene oxide, poly(HEMA), polysulfonates, polysulfates, polylactam, polyglycolic acid, polyamines, and the like, and mixtures thereof. More preferably, the coating is poly(acrylic acid), poly(methacrylic acid), poly(dimeth)acrylamide, poly (acrylamide), or poly(HEMA). Most preferably, poly(acrylic acid), poly(acrylamide), or poly(HEMA) is used. Preferably, the coating is selected and applied as described in U.S. Pat. No. 6,478,423, incorporated herein by reference.

Broadly, the surface treatment process (or a surface modification process) can be any means of contact of the back surface with a vapor or liquid, and/or application of an energy source to apply a coating to the back surface of the lens, adsorb a chemical species onto the back surface of the lens, alter the chemical nature (e.g., electrostatic charge) of chemical groups on the back surface of the lens or otherwise modify the surface properties of the back surface of the lens. Exemplary surface treatment processes include, but are not limited to, a surface treatment by energy (e.g., a plasma, a static electrical charge, irradiation, or other energy source), chemical treatments, the grafting of hydrophilic monomers or macromers onto the back surface of the lens, and layer-by-layer deposition of polyelectrolytes. Poly(acrylic acid) or PAA is the most preferred coating; poly(N-vinyl pyrrolidone) or PVP is also a preferred coating. Exemplary coating materials and methods useful in the lenses and methods of the invention are described, for example, in U.S. Pat. Nos. 7,798,639; 6,926,965; 6,893,685; 5,805,264 all of which are incorporated herein by reference. Plasma gases and processing conditions are described more fully in U.S. Pat. Nos. 4,312,575 and 4,632,844, which are incorporated herein by reference.

One coating process embodiment involves solely dip-coating and dip-rinsing steps. Another coating process embodiment involves solely spray-coating and spray-rinsing steps. However, a number of alternatives involve various combinations of spray- and dip-coating and rinsing steps may be designed by a person having ordinary skill in the art. In any case, the front surface of the lens is blocked or shielded so that only the back surface is coated. This can be done, for example, by simple mechanical fixturing of the lens mold or lathed lens precursor, while in the non or partially hydrated state. This can also be done for a partially hydrated lens mold by removing the back surface intermediate mold and applying the coating before the lens is sent for full demold and hydration. The coating may be applied by pad printing, fluid jet spraying, piezo dispensing apparatus, and the like.

One dip-coating alternative involves the steps of applying a coating of a first polyionic material to a lens by immersing the lens in a first solution of a first polyionic material; rinsing the lens by immersing it in a rinsing solution; and, optionally, drying. This procedure can be repeated using a second polyionic material, with the second polyionic material having charges opposite of the charges of the first polyionic material, in order to form a polyionic bilayer. This bilayer formation process may be repeated a plurality of times in order to produce a thicker coating. The immersion time for each of the coating and rinsing steps may vary depending on a number of factors. Preferably, immersion of the core material into the polyionic solution occurs over a period of about 1 to 30 minutes, more preferably about 2 to 20 minutes, and most preferably about 1 to 5 minutes. Rinsing may be accomplished with a plurality of rinsing steps, but a single rinsing step can be effective.

Alternatively, the coating process can involve spray coating techniques. The process generally includes the steps of applying a coating of a first polyionic material to the lens surface with a first solution of a first polyionic material; rinsing the lens by spraying it with a rinsing solution; and optionally, drying. Air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process can all be used as can any other of the known spray techniques. A computer system capable of controlling the positioning of the dispensing head of the spraying device on the lens and dispensing the coating liquid is generally used.

In general, coatings formed from polyionic solutions can be prepared by dissolving a suitable amount of the solution in water. For example, a polyanionic material such as polyacrylic acid having a molecular weight of about 90,000 can be preferably dissolved in water such that a 0.001M PAA solution is made. Once dissolved, the pH of the polyanionic solution can be adjusted by adding a basic or acidic material. In the embodiment above, for example, a suitable amount of 1N hydrochloric acid (HCl) can be added to adjust the pH to 2.5. Polycationic solutions can also be formed in this manner. For example, in one embodiment, poly(allylamine hydrochloride) having a molecular weight of about 50,000 to about 65,000 can be dissolved in water to form a 0.001M PAH solution. Thereafter, the pH can also be adjusted to 2.5 by adding a suitable amount of hydrochloric acid. In some embodiments of the present invention, it may be desirable to apply a solution containing both polyanionic and polycationic materials within a single solution.

A lens according to the invention can also be made by first applying a lubricious coating to a mold for making the lens and then transfer-grafting the lubricious coating to the lens made from the mold.

Figure 1:
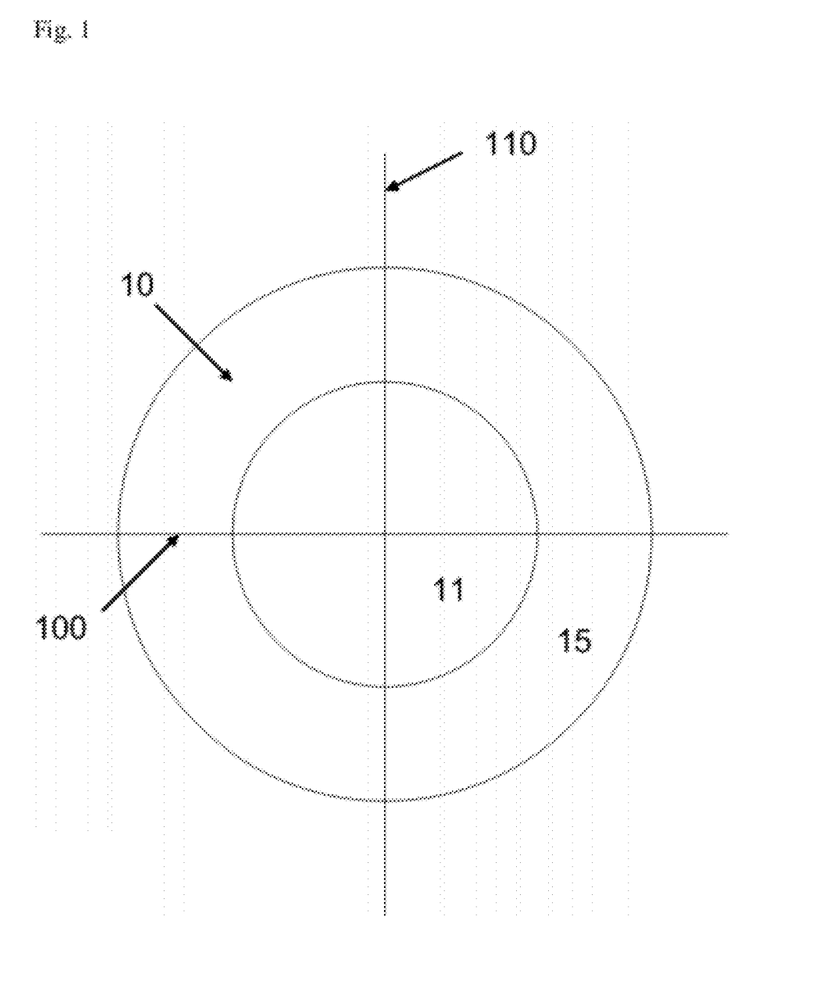
FIG. 1 shows the plan view of the posterior surface of a contact lens according to the invention

As can be seen in FIG. 1, the back surface 10 of a contact lens is shown. Lines 100 and 110 represent the horizontal, or 0-180 degree, and vertical, or 90-270 degree, meridians of the lens, respectively. The surface includes an optic zone 11 surrounded by non-optical peripheral zone 15. The centers of optic zone 11 and non-optical peripheral zone 15 are preferably located at the geometric center of the lens 10. For convenience, the boundaries of the various zones in all of the figures are shown as discrete lines. However, one ordinarily skilled in the art will recognize that the boundaries may be blended or aspheric.

Figure 2:
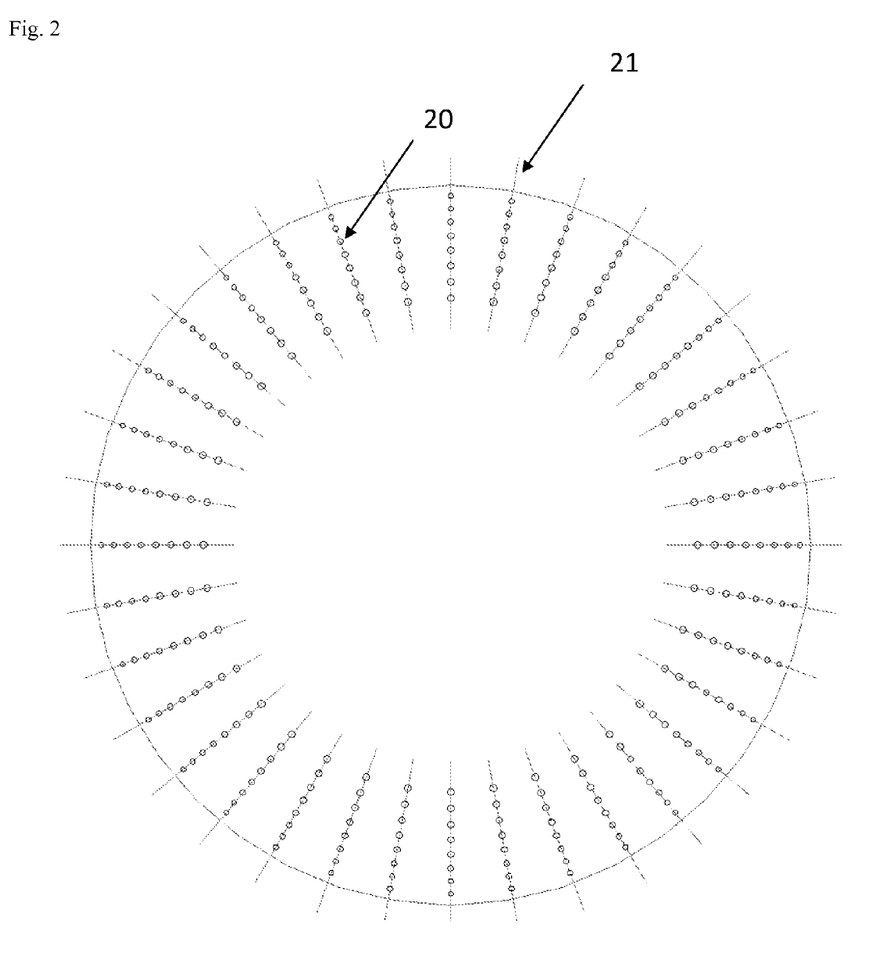
FIG. 2 shows one aspect of the dimple pattern of the invention.

Turning to FIG. 2, a regular dimple pattern is shown. Dimples, 20 are imparted into the back surface of the lens in a radially symmetric manner. They are aligned along equally spaced radial spokes, 21 (not seen on actual lenses). Preferably, as shown, an equal number of dimples, equally spaced along each meridian is shown. Dimple pattern regularity aids in the production of the mold tools in this embodiment.

Figure 3:
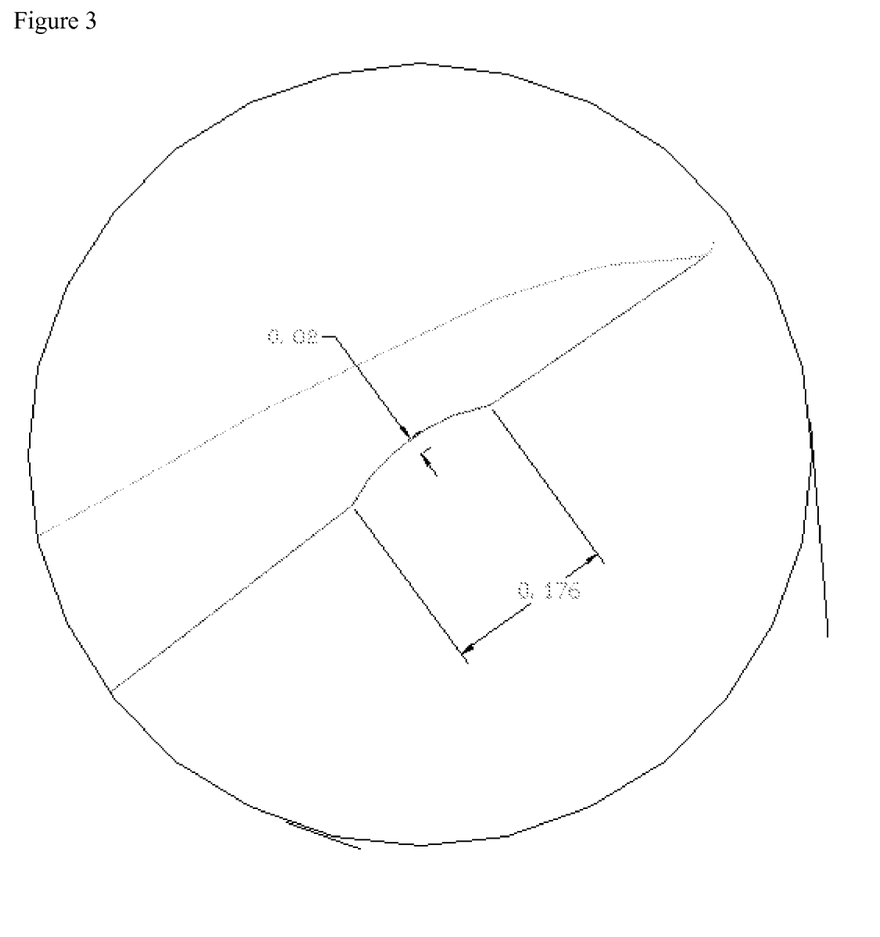
FIG. 3 shows a single dimple according to the invention.
Figure 4:
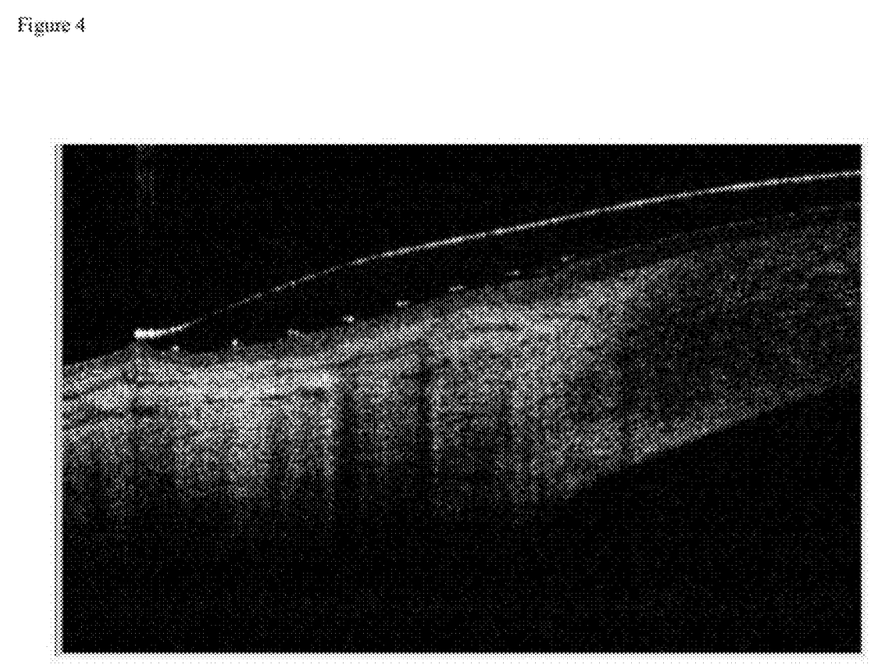
FIG. 4 shows a cross sectional photomicrograph of a lens made according to the invention.

FIG. 3 shows a close up cross sectional view of a dimple on a lens surface. The dimple has a defined depth and radius. FIG. 4 shows a micrograph of an actual lens surface similar to that drawn in FIG. 3.

The one or more optical zones 11 of the lenses are generally surrounded by non-optical, lenticular zones 15. The optical zones 11 may have at least one near and one distance vision zones as described, for example, in U.S. Pat. No. 7,503,652 incorporated by reference herein in its entirety. Many different shapes of vision zones are possible. Optics can be bifocal, trifocal or have even more vision zones. A "multi-focal translating contact lens" refers to a translating contact lens that comprises bifocal, trifocal or multi-focal optics. Optic zones can be circular or non circular in shape; arcuate, straight line, multiple concentric, radially varying concentric, progressively changing power functions, and geometric inset segments. The optical zone 11 may also be of a single power.

The optical zone 11 of at least one of the anterior and posterior surfaces of a multi-focal translating contact lens according to this invention can include a distant vision zone, an intermediate vision zone, and a near vision zone. The multi-focal translating contact lens can provide distant vision correction at a primary gaze (e.g. driving), intermediate vision correction at a half-down-gaze (e.g. work on computer) and near vision correction at full-down-gaze (e.g. read books and newspaper).

In a preferred embodiment, the intermediate vision zone in a translating lens of the present invention is a progressive power zone, which has an optical power that continuously changes from the distant vision to the near vision. Effective use of a trifocal translating contact lens or a multi-focal translating contact lens having a progressive power zone requires varying amounts of translation across the surface of the eye when the eye changes from gazing at an object at a distance (primary gaze) to gazing at an object at an intermediate distance (partially-down or half-down gaze) or to gazing at a nearby object (fully-down gaze).

The lenses of the invention can also include features to orient the lens for stabilization. These are in addition to the pseudotruncation and serve to make sure that the pseudotruncation is on the bottom of the lens, adjacent to the lower eyelid when worn. Stabilization or orientation features include stabilization zones, prism ballast, slab off, dynamic stabilization and the like.

The contact lenses of the invention may be either hard or soft lenses, but preferably are soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens material contains a siloxane functionality, including, without limitation, polydimethyl siloxane macromers, methacryloxypropyl polyalkyl siloxanes, and mixtures thereof, a silicone hydrogel or a hydrogel, made of monomers containing hydroxy groups, carboxyl groups, or combinations thereof. Materials for making soft contact lenses are well known and commercially available. Preferably, the material is senofilcon, narafilon, acquafilcon, etafilcon, genfilcon, lenefilcon, balafilcon, or lotrafilcon.

The lenses of the invention may be made using any known process for contact lens production. Preferably, the lenses are made by photocuring the lens composition and applying a coating to the cured lens. Various processes are known for molding the reaction mixture in the production of contact lenses, including spincasting and static casting. The preferred method for producing contact lenses of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to produce a polymer in the approximate shape of the final desired product. The conditions for such polymerization are well known in the art. The polymer mixture optionally may be treated with a solvent and then water, producing a silicone hydrogel having a final size and shape similar to the size and shape of the original molded polymer article. This method can be used to form contact lenses and is further described in U.S. Pat. Nos. 4,495,313, 4,680,336, 4,889,664 and 5,039,459 incorporated herein by reference in their entireties. In a process such as molding, the dimple pattern is imparted to the mold by use of a mold tool having the dimple shape and depth. Molding process are generally a two step or more preferably a three step process, with an intermediate cast mold. In the three step process, the dimple is formed as a depressed portion in a concave master mold of the back surface. The master mold is preferably metallic, but may be ceramic. Metallic master molds are machined from steel, brass, aluminum or the like. The master mold is then used to generate an intermediate cast mold, in which the curve is now convex, and the dimple is present as a raised portion on the intermediate back curve cast mold. The final lens will be cast from the back curve cast mold, assembled along with a front curve mold created by the same process. In the two step process, non-hydrated lens polymer material will be directly processed, most preferably by precision lathing. In this case, the dimples are machined into the non-hydrated polymer material, with the dimples being depressions on the concave surface.

The invention may be further clarified by a consideration of the following examples.

EXAMPLE 1

A senofilcon lens in accordance with FIG. 1 was provided. Referring to FIG. 1, contact lens 10 had a diameter of about 14.2 mm, a back optic zone 11 had a diameter of about 9.5 mm. The dimple pattern that was used is seen in FIG. 2. The cross sectional shape of the dimples is shown in FIG. 3, and a cross section of an actual lens made according to this example while being worn on the eye is shown in FIG. 4. FIG. 4 was obtained by imaging the lens and eye using Optical Coherence Tomography. It can be seen in this example that the addition of the dimples on the back surface did not cause a change in shape of the front surface of the lens. These dimples were circular in shape, with a diameter of about 0.170 mm, and were distributed along radial spokes 21 around the center of the lens. In this example, the spokes were evenly distributed around the lens every 10 degrees and each spoke contained 8 dimples.

EXAMPLE 2 (Prophetic)

The lens described in Example 1 are produced as part of an in vivo experiment. The addition of the dimples on the back surface do not cause a change in shape of the front surface of the lens. When placed on the eye, the lens move more readily than a control lens with similar parameters, but without dimples. The lens according to the present invention move 0.75 mm with blink compared to 0.25 mm without the dimpling feature according to this invention.

EXAMPLE 3 (Prophetic)

A translating senofilcon lens in accordance with FIG. 1 is provided with the dimple pattern of FIG. 2. The contact lens has a diameter of about 14.2 mm and the optic zone has a diameter of about 8 mm. The addition of the dimples on the back surface do not cause a change in shape of the front surface of the lens. The lens is used in an in vivo experiment. When placed on the eye, the lens translates with downgaze more readily than a control lens with similar parameters, but without dimples. The lens according to the present invention translates about 1.5 mm with downgaze compared to 0.25 mm without the dimpling feature according to this invention.

EXAMPLE 4

An etafilcon A lens was made by photocuring a mixture of 800-1000 MW ($M_n$) monomethacryloxypropyl terminated mono-n-butyl terminated polydimethylsiloxane; 2-propenoic acid, 2-methyl-,2-hydroxy-3-[3-[1,3,3,3-tetramethyl-1-[(trimethylsilyl)oxy]disiloxanyl]propoxy]propyl ester, N,N-dimethylacrylamide; 2-hydroxyethylmethacrylate; 2-(2'-hydroxy-5-methacryloxyethylphenyl)-2H-benzotriazole; poly(N-vinyl pyrrolidone) (K value 90) and tetraethyleneglycol dimethacrylate using 3,7-dimethyl-3-octanol as a diluent and CGI 1850 as a photoinitiator in a two part plastic mold. The mold was opened, leaving the prehydrated lens adhered to the front mold. The lens and mold were placed into a 3% solution of 250,000 $M_w$ polyacrylic acid in water. N-(3-dimethylaminopropyl)-N'-ethylcarbodiimide hydrochloride (0.25% of the water solution) was added. The lens/mold and solution were swirled at room temperature for 2 minutes and then rinsed with water three times. The lens was released into a 70/30 (vol) solution of isopropanol and water. The lens was then placed into borate buffered saline with several exchanges, and autoclaved. When clinically evaluated, the lens made according to the present invention moved substantially more than a lens made without treatment with polyacrylic acid.

We claim:

1. A contact lens, the contact lens comprising:
a front surface;
a back surface;
an optic zone;
a peripheral zone surrounding the optic zone; and
a plurality of dimples on the back surface of the contact lens in the peripheral zone, the plurality of dimples being arranged along equally spaced radial spokes, with no dimples between adjacent spokes, wherein each spoke includes an equal number of equally spaced dimples.

2. The contact lens according to claim 1, wherein the optic zone comprises a multifocal optical zone.

3. The contact lens according to claim 1, wherein the optic zone comprises a single power optical zone.

4. The contact lens according to claim 3, wherein the single power optical zone includes a spherocylindrical power.

5. The contact of lens according to claim 1, wherein the plurality of dimples are spaced apart so that the distance between them is at least 10 microns.

6. The contact lens according to claim 1, wherein the plurality of dimple centers are spaced apart by between 10 to 500 microns.

7. The contact lens according to claim 1, wherein the plurality of dimple centers are spaced apart by between 100 to 400 microns.

8. The contact lens according to claim 1, wherein the plurality of dimple centers are spaced apart by between 300 to 400 microns.

9. The contact lens according to claim 1, wherein the plurality of dimples have a depth of between 5 to 60 microns.

10. The contact lens according to claim 1, wherein the plurality of dimples have a depth of between 10 to 40 microns.

11. The contact lens according to claim 1, wherein the plurality of dimples have a depth of between 20 to 30 microns.

12. The contact lens according to claim 1, wherein the plurality of dimples have a diameter of between 2 to 500 microns.

13. The contact lens according to claim 1, wherein the plurality of dimples have a diameter of between 50 to 400 microns.

14. The contact lens according to claim 1, wherein the plurality of dimples have a diameter of between 100 to 300 microns.

15. The contact lens according to claim 1, wherein the plurality of dimples have a shape selected from the group consisting of circular and elliptical shapes.

16. The contact lens according to claim 1, wherein the plurality of dimples have a shape selected from the group consisting of regular polygons.

17. The contact lens according to claim 1, wherein the plurality of dimples have an irregular shape.

18. The contact lens according to claim 1, wherein the plurality of dimples are distributed over the entire surface.

19. The contact lens according to claim 1, wherein the plurality of dimples are distributed over a portion of the surface.

20. The contact lens according to claim 1, wherein the plurality of dimples are distributed over an area between about 5 to about 75 percent of the total back surface area.

21. The contact lens according to claim 1, wherein the plurality of dimples are arranged in a fractal pattern.

* * * * *